(12) United States Patent
Higashibara

(10) Patent No.: US 12,548,343 B2
(45) Date of Patent: Feb. 10, 2026

(54) SIGNAL PROCESSING DEVICE, SIGNAL PROCESSING SYSTEM, SIGNAL PROCESSING METHOD, AND PROGRAM

(71) Applicant: Sony Semiconductor Solutions Corporation, Kanagawa (JP)

(72) Inventor: Kiyoshi Higashibara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 46 days.

(21) Appl. No.: 18/683,047

(22) PCT Filed: Jun. 3, 2022

(86) PCT No.: PCT/JP2022/022647
§ 371 (c)(1),
(2) Date: Feb. 12, 2024

(87) PCT Pub. No.: WO2023/026626
PCT Pub. Date: Mar. 2, 2023

(65) Prior Publication Data
US 2024/0355126 A1    Oct. 24, 2024

(30) Foreign Application Priority Data
Aug. 24, 2021 (JP) ................. 2021-136499

(51) Int. Cl.
*G05D 1/02* (2020.01)
*G06T 5/80* (2024.01)
(Continued)

(52) U.S. Cl.
CPC ............... *G06V 20/56* (2022.01); *G06T 5/80* (2024.01); *G06T 7/20* (2013.01); *G06T 7/70* (2017.01); *G06T 2207/30252* (2013.01)

(58) Field of Classification Search
CPC ... G05D 1/02; G06T 7/73; G06K 9/00; G06N 99/00; H04N 17/00
(Continued)

(56) References Cited

U.S. PATENT DOCUMENTS

| 11,740,099 B2 * | 8/2023 | van der Molen .... G06V 20/588 |
| | | 701/450 |
| 2012/0081512 A1 | 4/2012 | Shimizu |

(Continued)

FOREIGN PATENT DOCUMENTS

| JP | 5173551 B2 | 4/2013 |
| JP | 2016-185275 A | 10/2016 |

(Continued)

OTHER PUBLICATIONS

International Search Report and English translation thereof mailed Aug. 16, 2022 in connection with International Application No. PCT/JP2022/022647.

*Primary Examiner* — Daquan Zhao
(74) *Attorney, Agent, or Firm* — Wolf, Greenfield & Sacks, P.C.

(57) ABSTRACT

There is provided a technology advantageous for detecting an installation error of an imaging device in a mobile object. The present disclosure relates to a signal processing device including: a vanishing point estimation unit that acquires a surrounding image captured by an imaging device including an optical system which has an optical axis non-parallel to a moving direction of the imaging device and estimates estimated vanishing point position information indicating a position of a vanishing point by analyzing the surrounding image; and an attachment detection unit that acquires imaging attachment information indicating an attachment posture of the imaging device on the basis of the estimated vanishing (Continued)

point position information and reference vanishing point position information indicating a position of a reference vanishing point.

15 Claims, 12 Drawing Sheets

(51) Int. Cl.
*G06T 7/20* (2017.01)
*G06T 7/70* (2017.01)
*G06V 20/56* (2022.01)
*G06K 9/00* (2022.01)

(58) Field of Classification Search
USPC ............. 348/187, 50, 49, 48, 47, 42, 61
See application file for complete search history.

(56) References Cited

U.S. PATENT DOCUMENTS

2017/0294002 A1* 10/2017 Jia ........................ G06T 7/80
2018/0365859 A1   12/2018 Oba et al.
2021/0241492 A1*  8/2021 Hsu ....................... G06T 7/13

FOREIGN PATENT DOCUMENTS

| JP | 6354425 B2 | 7/2018 |
| JP | 2018-160732 A | 10/2018 |
| WO | WO 2010/146695 A1 | 12/2010 |
| WO | WO 2017/122552 A1 | 7/2017 |

* cited by examiner

SIGNAL PROCESSING DEVICE, SIGNAL PROCESSING SYSTEM, SIGNAL PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/022647, filed in the Japanese Patent Office as a Receiving Office on Jun. 3, 2022, which claims priority to Japanese Patent Application Number JP2021-136499, filed in the Japanese Patent Office on Aug. 24, 2021, each of which is hereby incorporated by reference in its entirety.

TECHNICAL FIELD

The present disclosure relates to a signal processing device, a signal processing system, a signal processing method, and a program.

BACKGROUND ART

There is known a camera system that displays an image captured by a camera installed in a front portion, a rear portion, and/or both side portions of a vehicle on a monitor installed near a driver's seat. With this camera system, a surrounding situation that cannot be visually recognized from the driver's seat is presented to the driver, and driving of the vehicle is assisted.

There is an error in installation of such a camera mounted on a vehicle in some cases. For example, when a camera is attached to a vehicle, an error occurs in an installation angle of the camera (posture of the camera: for example, a yaw angle and/or a pitch angle of the camera) in some cases. Furthermore, the installation angle of the camera may be deviated due to vibration and impact acting on the vehicle during traveling.

CITATION LIST

Patent Document

Patent Document 1: Japanese Patent No. 5173551
Patent Document 2: Japanese Patent No. 6354425

SUMMARY OF THE INVENTION

Problems to be Solved by the Invention

When an installation error of the camera occurs, a deviation occurs between an actual imaging area of the camera and an original imaging area.

Depending on the camera system, an image of an auxiliary line such as a reference line and a course prediction line or another auxiliary image is displayed on the monitor so as to be superimposed on an image captured by the camera in some cases. In this case, if there is a deviation in the imaging area due to an installation error of the camera, the auxiliary image is displayed at a position deviated from the original position.

Furthermore, in recent years, an in-vehicle camera is used not only as a camera that provides a monitoring image to the driver, but also as a camera that provides an image for realizing a driving assist function and an automated driving function by a vehicle system. For example, the vehicle system can detect a target such as an obstacle or a pedestrian from an image captured by the camera, measure the distance between the vehicle and the target, and send the measurement result to a drive unit on the vehicle side. In this case, the drive unit can issue a warning notification to the driver or operate the automatic brakes on the basis of the measurement result. However, if there is an installation error in the camera and the camera is not attached to the vehicle according to a predetermined design, an error occurs in the measured distance between the vehicle and the target in some cases, which might cause malfunction of a warning notification or the automatic brakes.

The present disclosure provides a technology advantageous for detecting an installation error of an imaging device in a mobile object such as a vehicle.

Solutions to Problems

One aspect of the present disclosure relates to a signal processing device including: a vanishing point estimation unit that acquires a surrounding image captured by an imaging device including an optical system which has an optical axis non-parallel to a moving direction of the imaging device and estimates estimated vanishing point position information indicating a position of a vanishing point by analyzing the surrounding image; and an attachment detection unit that acquires imaging attachment information indicating an attachment posture of the imaging device on the basis of the estimated vanishing point position information and reference vanishing point position information indicating a position of a reference vanishing point.

The surrounding image may include the vanishing point.

The surrounding image may not include the vanishing point.

The surrounding image may include a first imaging direction image related to a first imaging direction acquired by a first imaging device and a second imaging direction image related to a second imaging direction acquired by a second imaging device different from the first imaging device, the vanishing point estimation unit may estimate first estimated vanishing point position information indicating a position of the vanishing point by analyzing the first imaging direction image, and estimate second estimated vanishing point position information indicating a position of the vanishing point by analyzing the second imaging direction image, and the attachment detection unit may acquire the imaging attachment information on the basis of the first estimated vanishing point position information, the second estimated vanishing point position information, and the reference vanishing point position information.

The attachment detection unit may acquire first imaging attachment information indicating an attachment posture of the first imaging device on the basis of the first estimated vanishing point position information and the reference vanishing point position information, and acquire second imaging attachment information indicating an attachment posture of the second imaging device on the basis of the second estimated vanishing point position information and the reference vanishing point position information.

The attachment detection unit may acquire first imaging attachment information indicating an attachment posture of the first imaging device on the basis of the first estimated vanishing point position information and the reference vanishing point position information, and acquire second imaging attachment information indicating an attachment posture of the second imaging device on the basis of the first estimated vanishing point position information, the second estimated vanishing point position information, and the first imaging attachment information.

The surrounding image may include a first imaging direction image related to a first imaging direction acquired by a first imaging device and a second imaging direction image related to a second imaging direction acquired by a second imaging device different from the first imaging device, the vanishing point estimation unit may estimate first estimated vanishing point position information indicating a position of the vanishing point by analyzing the first imaging direction image, and estimate second estimated vanishing point position information indicating a position of the vanishing point by analyzing the second imaging direction image, and the attachment detection unit may acquire the imaging attachment information indicating the attachment posture of the second imaging device by using the first estimated vanishing point position information as the reference vanishing point position information.

An imaging correction unit that performs correction for reducing image distortion caused by the optical system on the surrounding image may be included, and the vanishing point estimation unit may estimate the estimated vanishing point position information by analyzing the surrounding image corrected by the imaging correction unit.

The vanishing point estimation unit may estimate the estimated vanishing point position information on the basis of an optical flow of the surrounding image.

A first correction unit that corrects an image on the basis of the imaging attachment information may be included.

A second correction unit that corrects target distance measurement information indicating a distance to a surrounding target on the basis of the imaging attachment information may be included.

Another aspect of the present disclosure relates to a signal processing system including: an imaging device that is mounted on a mobile object and acquires a surrounding image via an optical system which has an optical axis non-parallel to a moving direction of the mobile object; and a signal processing device that detects an attachment posture of the imaging device on the basis of the surrounding image, the signal processing device including a vanishing point estimation unit that receives the surrounding image captured by the imaging device, and estimates estimated vanishing point position information indicating a position of a vanishing point by analyzing the surrounding image acquired via the optical system which has the optical axis non-parallel to the moving direction, and an attachment detection unit that acquires imaging attachment information indicating an attachment posture of the imaging device on the basis of the estimated vanishing point position information and reference vanishing point position information indicating a position of a reference vanishing point.

The surrounding image may include an image of at least one of an area in front of the mobile object or an area behind the mobile object.

The surrounding image may include an image of an area on a side of the mobile object.

Another aspect of the present disclosure relates to a signal processing method including: a step of acquiring a surrounding image captured by an imaging device including an optical system which has an optical axis non-parallel to a moving direction of the imaging device; a step of estimating estimated vanishing point position information indicating a position of a vanishing point by analyzing the surrounding image; and a step of acquiring an attachment posture of the imaging device on the basis of the estimated vanishing point position information and reference vanishing point position information indicating a position of a reference vanishing point set in advance.

Another aspect of the present disclosure relates to a program for causing a computer to execute: a procedure of acquiring a surrounding image captured by an imaging device including an optical system which has an optical axis non-parallel to a moving direction of the imaging device; a procedure of estimating estimated vanishing point position information indicating a position of a vanishing point by analyzing the surrounding image; and a procedure of acquiring an attachment posture of the imaging device on the basis of the estimated vanishing point position information and reference vanishing point position information indicating a position of a reference vanishing point set in advance.

MODE FOR CARRYING OUT THE INVENTION

Exemplary embodiments of the present disclosure will be described with reference to the drawings.

Hereinafter, a signal processing device, a signal processing system, and a signal processing method capable of detecting an installation error of an imaging device (camera) mounted on a vehicle (particularly, a passenger car) will be exemplified. However, the technology described below can also be applied to any mobile object (for example, a flying object such as a drone, a ship, and a robot) other than the vehicle.

Figure 1:
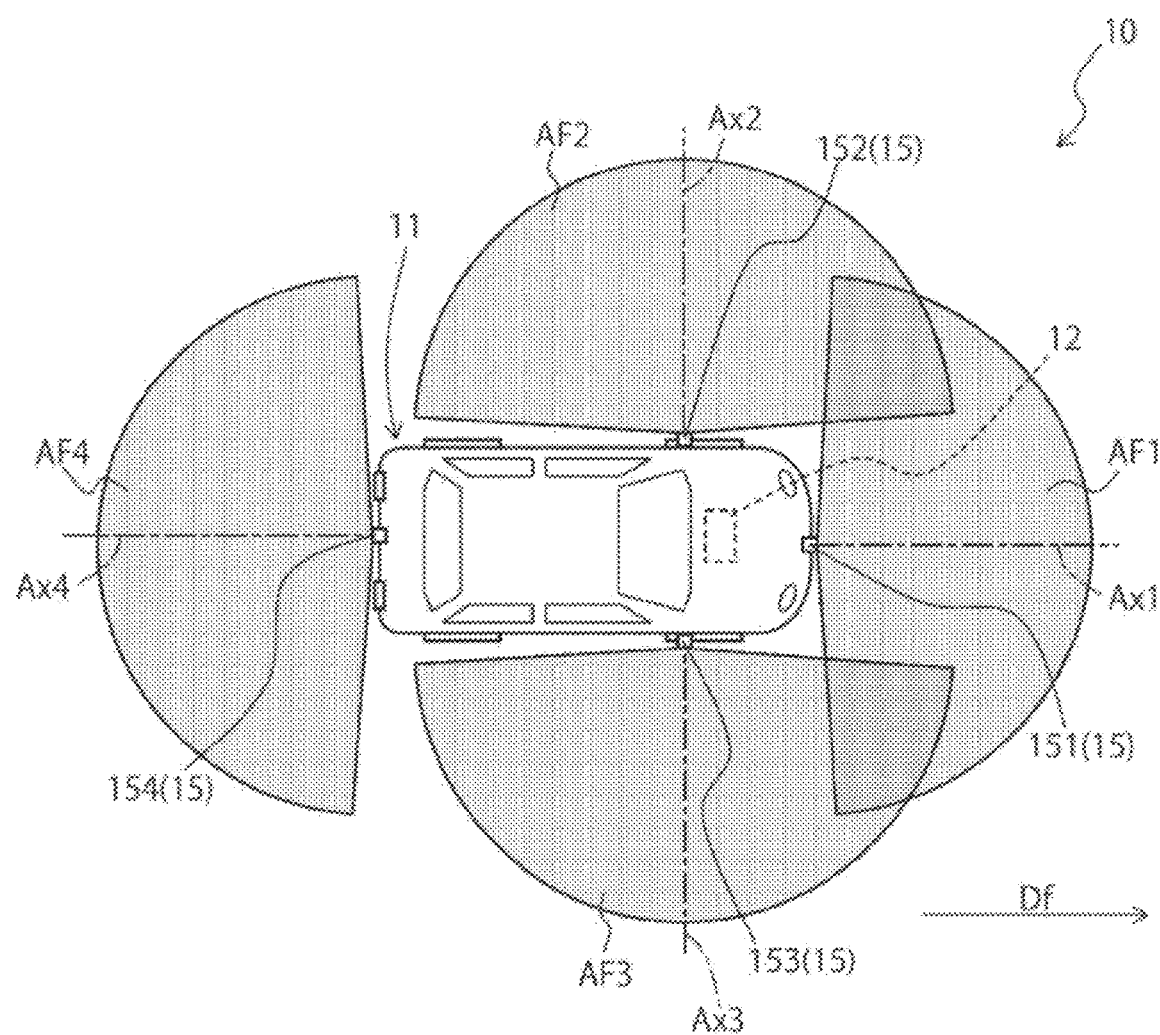
FIG. 1 is a view of an example of a signal processing system as viewed from above.

FIG. 1 is a view of an example of a signal processing system 10 as viewed from above.

The signal processing system 10 includes a plurality of imaging devices 15 and a signal processing device 12.

Each imaging device 15 mounted on the vehicle 11 moves together with the vehicle 11 and images the surroundings of the vehicle 11 to acquire a surrounding image.

The plurality of imaging devices 15 is preferably attached to the vehicle 11 such that there is no blind spot around the vehicle 11 or the blind spot range is as small as possible. However, the plurality of imaging devices 15 can be installed in any part of the vehicle 11, and is not necessarily required to be capable of acquiring a surrounding image of the entire range around the vehicle 11.

In the example illustrated in FIG. 1, as the imaging devices 15, a front camera 151 located in the front portion of the vehicle 11, a left side camera 152 and a right side camera 153 located in both side portions of the vehicle 11, and a back camera 154 located in the rear portion of the vehicle 11 are provided.

The front camera 151 has a front imaging angle of view range AF1 centered on a front imaging optical axis Ax1, and acquires an image of an area in front of the vehicle 11. The left side camera 152 has a left side imaging angle of view range AF2 centered on a left side imaging optical axis Ax2, and acquires an image of an area on the left of the vehicle 11. The right side camera 153 has a right side imaging angle of view range AF3 centered on a right side imaging optical axis Ax3, and acquires an image of an area on the right of the vehicle 11. The back camera 154 has a back imaging angle of view range AF4 centered on a back imaging optical axis Ax4, and acquires an image of an area behind the vehicle 11.

As described above, the surrounding images acquired by the imaging devices 15 of the present example include an image of an area in front of the vehicle 11, images of areas on both sides (that is, an area on the right and an area on the left) of the vehicle 11, and an image of an area behind the vehicle 11.

In the example illustrated in FIG. 1, the front imaging optical axis Ax1 extends in a moving direction (traveling direction) Df of the vehicle 11, the back imaging optical axis Ax4 extends in a direction opposite to the moving direction Df, and the left side imaging optical axis Ax2 and the right side imaging optical axis Ax3 extend in a horizontal direction perpendicular to the moving direction Df.

In FIG. 1, the imaging angle of view ranges AF1 to AF4 are illustrated in fan shapes, but the actual imaging range of the imaging device 15 includes the infinite range. Therefore, the left side imaging angle of view range AF2 and the right side imaging angle of view range AF3 are illustrated so as not to overlap with the back imaging angle of view range AF4 in FIG. 1, but actually, the left side imaging angle of view range AF2 and the right side imaging angle of view range AF3 overlap with the back imaging angle of view range AF4.

In the present example, four imaging devices 15 are provided, but the number of imaging devices 15 installed in the vehicle 11 is not limited. For example, two imaging devices 15, three imaging devices 15, or five or more imaging devices 15 may be attached to the vehicle 11.

In the example illustrated in FIG. 1, one imaging device 15 is provided on each of the front, back, left, and right of the vehicle 11, but two or more imaging devices 15 may be provided on each of the front, back, left, and right of the vehicle 11. Therefore, two or more imaging devices 15 constituting stereo cameras may be mounted on the vehicle 11.

As described above, the plurality of imaging devices 15 attached to the vehicle 11 includes at least a first imaging device and a second imaging device different from the first imaging device. Then, the surrounding images acquired by the plurality of imaging devices 15 include at least a first imaging direction image regarding a first imaging direction acquired by the first imaging device and a second imaging direction image regarding a second imaging direction acquired by the second imaging device. The first imaging direction and the second imaging direction herein are directions different from each other.

The signal processing device 12 mounted on the vehicle 11 includes, for example, a control unit including an arithmetic processing device and a memory, and can detect the attachment posture of the imaging device 15 on the basis of a surrounding image acquired by the imaging device 15.

The signal processing device 12 can detect a state quantity directly or indirectly indicating the attachment posture of the imaging device 15. For example, the signal processing device 12 may acquire information indicating an actual imaging direction (for example, an optical axis direction) of the imaging device 15 as imaging attachment information indicating the attachment posture of the imaging device 15.

Figure 2:
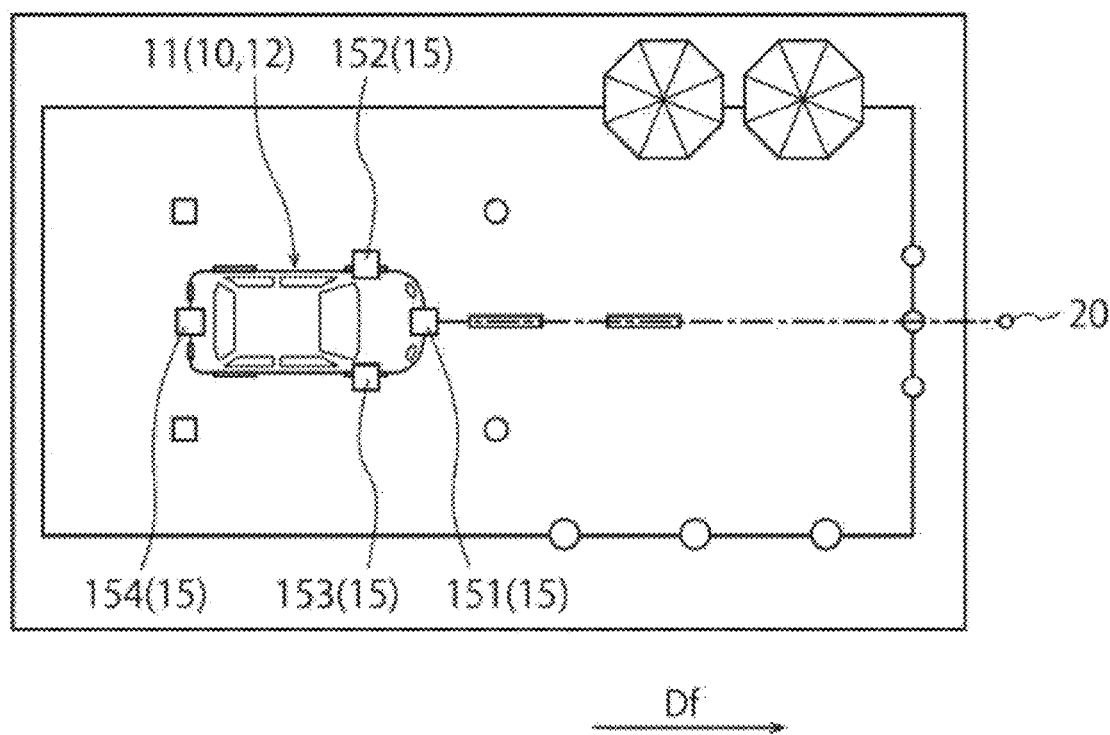
FIG. 2 is an overhead view of a vehicle and an example of an environment around the vehicle as viewed from above.

FIG. 2 is an overhead view of the vehicle 11 and an example of the environment around the vehicle 11 as viewed from above.

In the example illustrated in FIG. 2, there are three poles in front of the vehicle 11 traveling in the moving direction Df, there are two trees on the front left side of the vehicle 11, and there are three cones on the front right side of the vehicle 11.

In a captured image acquired by the imaging device 15 mounted on the vehicle 11, a vanishing point 20 exists, for example, in front of the vehicle 11 in the moving direction Df. The vanishing point 20 is a point that basically does not move in the image captured while the vehicle 11 is moving in the moving direction Df.

In the example illustrated in FIG. 2, the vanishing point 20 is located on a straight line extending from the vehicle 11 in the moving direction Df so as to pass through the central pole among the three poles provided in front of the vehicle 11.

Figure 3:
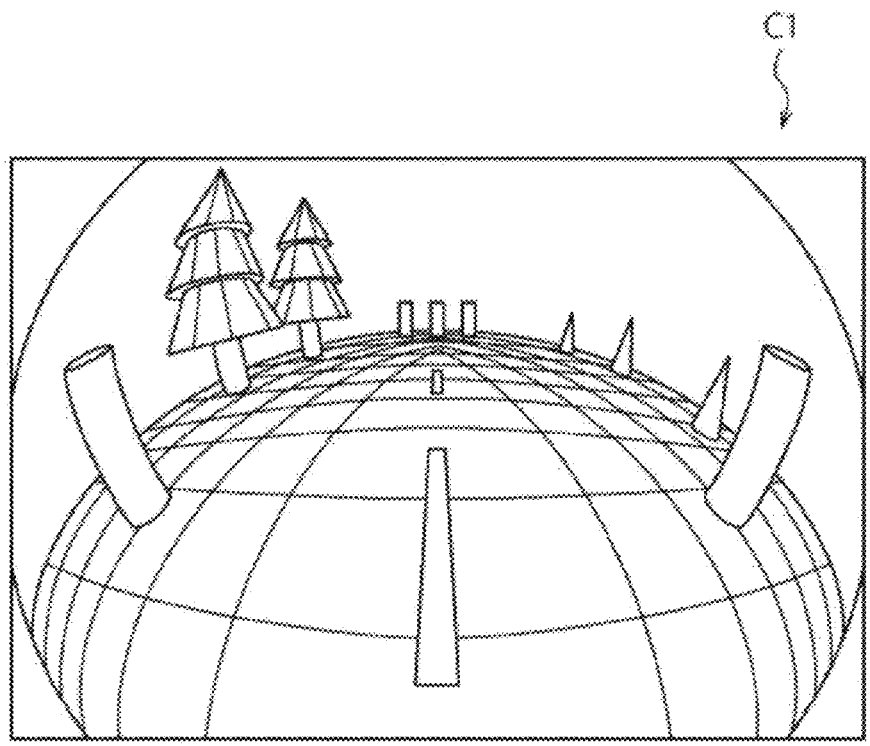
FIG. 3 is a view illustrating an example of a surrounding image (that is, a front surrounding image) captured and acquired by a front camera illustrated in FIG. 2.

FIG. 3 is a view illustrating an example of a surrounding image (that is, a front surrounding image C1) captured and acquired by the front camera 151 illustrated in FIG. 2.

As an example, the front surrounding image C1 illustrated in FIG. 3 is an image captured and acquired by the front camera 151 including a wide-angle fisheye lens (optical system) having a horizontal angle of view of 180 degrees in a state of being installed at a depression angle of 30 degrees at a height of 600 mm from a road surface.

The front surrounding image C1 illustrated in FIG. 3 is an image to which distortion correction for reducing distortion (aberration) unique to the wide-angle fisheye lens is not applied, and the image distortion caused by the wide-angle fisheye lens increases as the distance from the center of the image increases.

Figure 4:
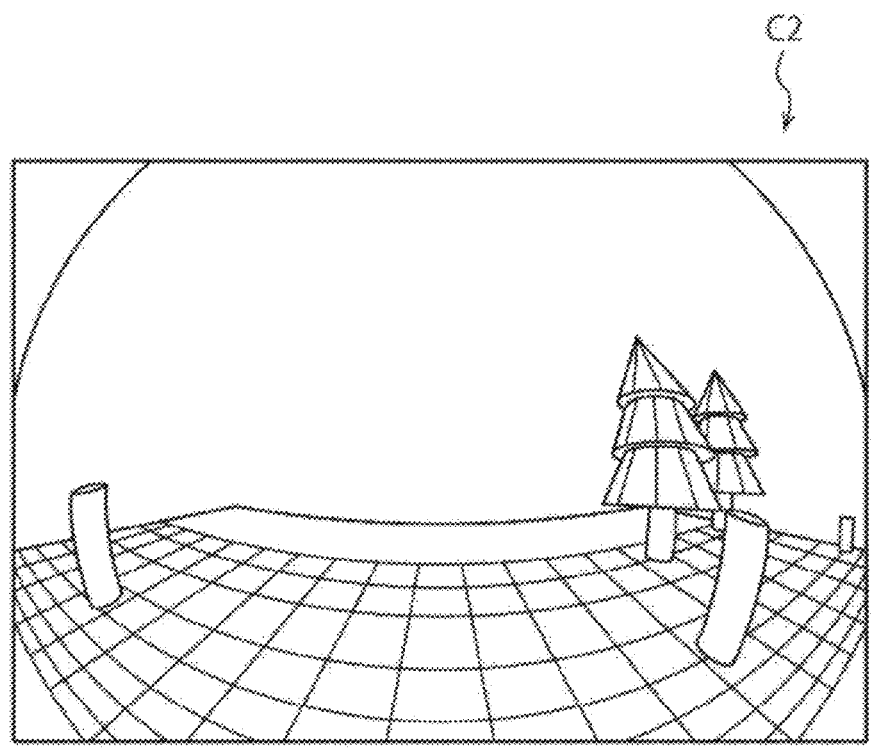
FIG. 4 is a view illustrating an example of a surrounding image (that is, a left side surrounding image) captured and acquired by a left side camera illustrated in FIG. 2.

FIG. 4 is a view illustrating an example of a surrounding image (that is, a left side surrounding image C2) captured and acquired by the left side camera 152 illustrated in FIG. 2.

As an example, the left side surrounding image C2 illustrated in FIG. 4 is an image captured and acquired by the left side camera 152 including a wide-angle fisheye lens having a horizontal angle of view of 180 degrees in a state of being installed at a depression angle of 0 degrees at a height of 1000 mm from the road surface.

The left side surrounding image C2 illustrated in FIG. 4 is also an image to which distortion correction for reducing distortion (aberration) unique to the wide-angle fisheye lens is not applied, and the image distortion caused by the wide-angle fisheye lens increases as the distance from the center of the image increases.

Since the vanishing point 20 (see FIG. 2) of the present example is located on the straight line extending from the vehicle 11 and passing through the central pole as described above, the vanishing point 20 is essentially present in the front surrounding image C1 illustrated in FIG. 3, but is not essentially present in the left side surrounding image C2 illustrated in FIG. 4.

However, the vanishing point 20 may exist in the left side surrounding image C2 and the right side surrounding image C3. For example, if the left side imaging optical axis Ax2 is directed to the front side of the vehicle 11 or the left side imaging angle of view range AF2 is wide, the vanishing point 20 can be included in the left side surrounding image C2 (for example, a peripheral portion).

The surrounding image acquired by the imaging device 15 (the front camera 151 to the back camera 154) in this manner may or may not include the vanishing point 20 within the range.

Figure 5:
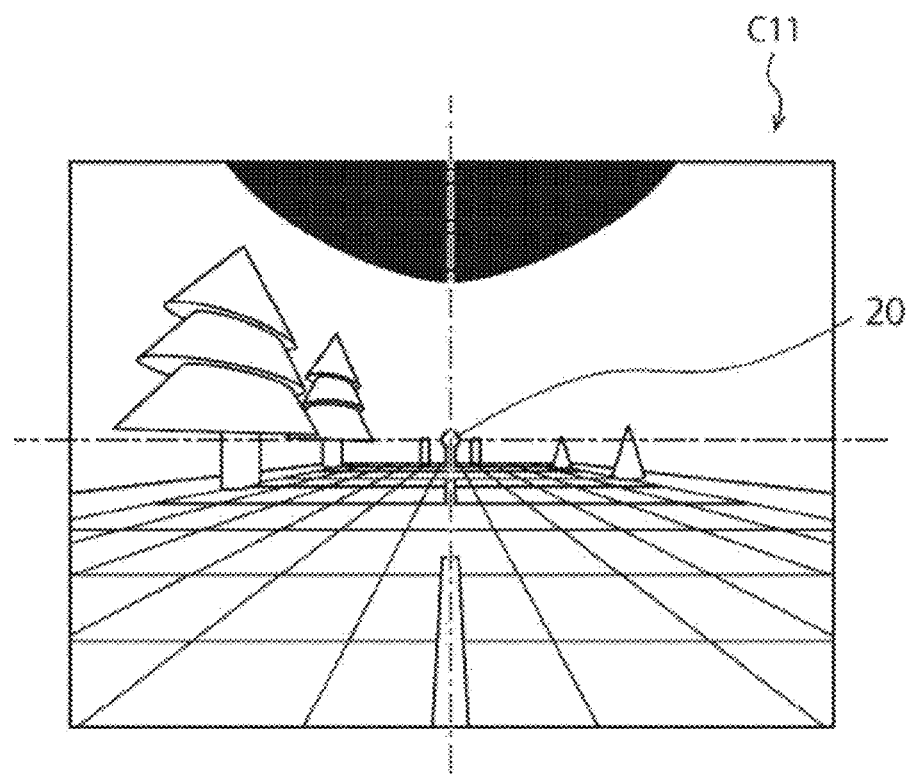
FIG. 5 illustrates an example of a corrected surrounding image (that is, a front corrected surrounding image) obtained by performing various corrections (including distortion correction) on the front surrounding image illustrated in FIG. 3.

FIG. 5 illustrates an example of a front corrected surrounding image C11 obtained by performing various corrections (including distortion correction) on the front surrounding image C1 illustrated in FIG. 3.

The front corrected surrounding image C11 illustrated in FIG. 5 has a virtual optical axis parallel to the horizontal plane and parallel to the moving direction Df of the vehicle 11, and image distortion caused by the wide-angle fisheye lens of the front camera 151 is removed (reduced).

That is, a correction process according to the distortion characteristics and the image height characteristics of the optical system of the front camera 151 and a process of projecting the front surrounding image C1 on a plane perpendicular to the moving direction Df are performed on the front surrounding image C1, whereby the front corrected surrounding image C11 illustrated in FIG. 5 is obtained.

Furthermore, the front corrected surrounding image C11 illustrated in FIG. 5 is obtained by converting the front surrounding image C1 so that the front corrected surrounding image C11 has a predetermined angle of view (for example, a horizontal angle of view of 100 degrees and a vertical angle of view of 80 degrees) and the vanishing point 20 is positioned at the center of the image. The angle of view adjustment of the front corrected surrounding image C11 and the position adjustment of the vanishing point 20 in the front corrected surrounding image C11 as described are performed by an image conversion process determined in advance on the basis of the imaging characteristics of the front camera 151 (imaging device 15).

Figure 6:
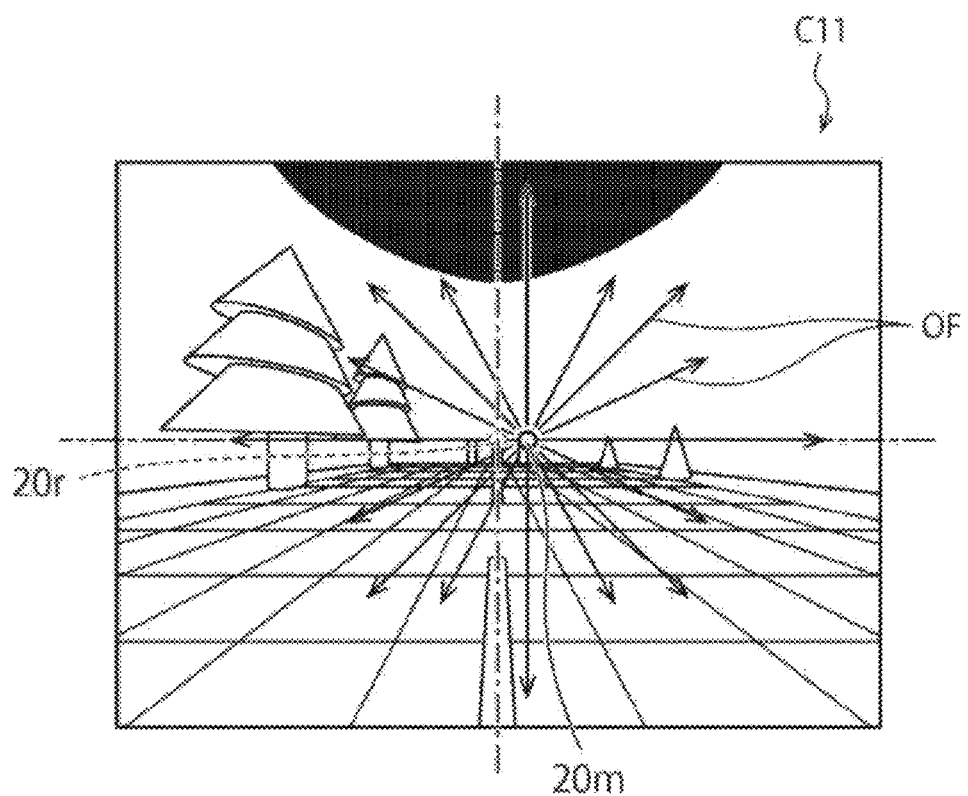
FIG. 6 is a view illustrating an example of optical flows in the front corrected surrounding image illustrated in FIG. 5.

FIG. 6 is a view illustrating an example of optical flows OF in the front corrected surrounding image C11 illustrated in FIG. 5.

The optical flow OF indicating the motion (vector) of a subject in an image captured over time is obtained from, for example, a locus of feature points in the image. In particular, in the front corrected surrounding image C11 from which image distortion caused by the optical system has been removed, the optical flow OF of the subject (particularly, a stationary body) becomes a straight line.

Therefore, in a case where the vehicle 11 linearly moves in the moving direction Df together with the imaging device 15, the optical flow OF in the front corrected surrounding image C11 is located on a straight line passing through the vanishing point 20 and draws a locus extending in a direction away from the vanishing point 20.

Therefore, in a case where the front camera 151 is mounted on the vehicle 11 as designed with no installation error, the vanishing point of the front corrected surrounding image C11 (that is, a reference vanishing point 20r) is located at a desired location in the front corrected surrounding image C11 (the center of the image in the present example).

In this case, the optical flow OF is located on a straight line radially extending from the desired location (center of the image) of the front corrected surrounding image C11.

In contrast, in a case where the front camera 151 is mounted on the vehicle 11 with an installation error, the actual vanishing point of the front corrected surrounding image C11 (that is, an estimated vanishing point 20m) is deviated from the desired location (center of the image; the reference vanishing point 20r).

The positional deviation amount of the estimated vanishing point 20m from the desired location (reference vanishing point 20r) is correlated with the installation error amount of the front camera 151 in the vehicle 11.

Therefore, the degree of the installation error (for example, the deviation of the pitch angle and the deviation of the yaw angle) of the front camera 151 in the vehicle 11 can be estimated on the basis of the positional deviation (for example, the number of deviated pixels and the deviation direction) of the estimated vanishing point 20m from the reference vanishing point 20r.

Figure 7:
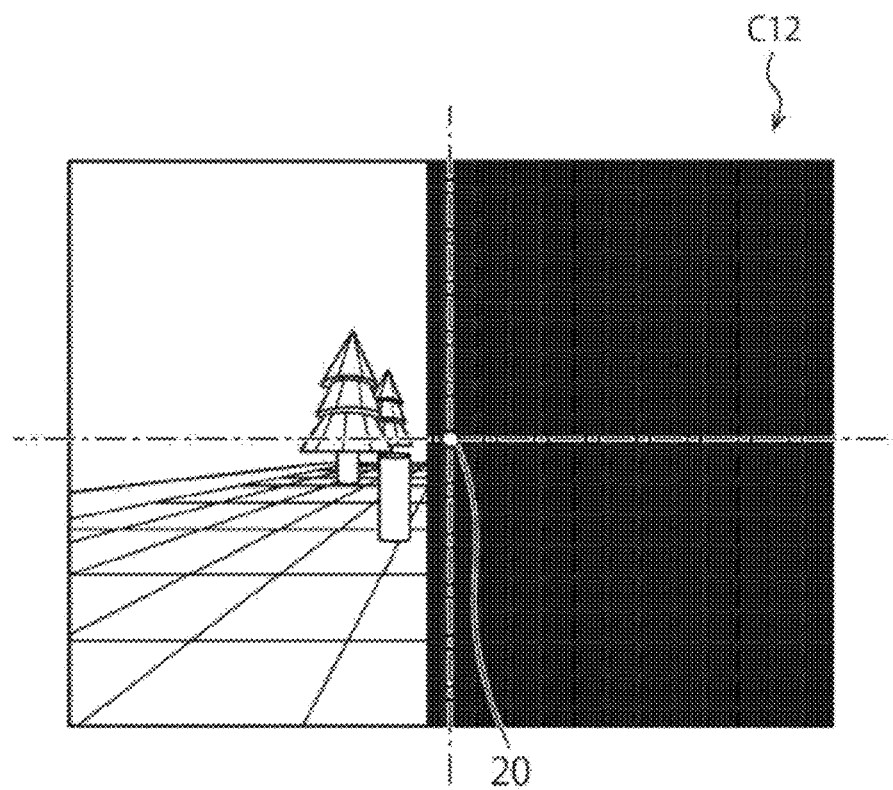
FIG. 7 illustrates an example of a corrected surrounding image (that is, a left side corrected surrounding image) obtained by performing various corrections (including distortion correction) on the left side surrounding image illustrated in FIG. 4.

FIG. 7 illustrates an example of a left side corrected surrounding image C12 obtained by performing various corrections (including distortion correction) on the left side surrounding image C2 illustrated in FIG. 4.

Similarly to the above-described front corrected surrounding image C11 (see FIG. 5), the left side corrected surrounding image C12 illustrated in FIG. 7 has a virtual optical axis parallel to the horizontal plane and parallel to the moving direction Df of the vehicle 11, and image distortion caused by the wide-angle fisheye lens of the left side camera 152 is removed (reduced). Here, the virtual optical axis of the left side corrected surrounding image C12 is common to the virtual optical axis of the front corrected surrounding image C11 described above.

Furthermore, the left side corrected surrounding image C12 illustrated in FIG. 7 is obtained by converting the left side surrounding image C2 so that the left side corrected surrounding image C12 has a predetermined angle of view (for example, a horizontal angle of view of 100 degrees and a vertical angle of view of 80 degrees) and the vanishing point 20 is positioned at a desired location (center of the image in the present example). The center of the image herein means the center of the entire image including not only the substantial captured image but also an image portion (see the black solid portion in FIG. 7) not including the substantial captured image.

The angle of view adjustment of the left side corrected surrounding image C12 and the position adjustment of the vanishing point 20 in the left side corrected surrounding image C12 as described are performed by an image conversion process determined in advance on the basis of the imaging characteristics of the left side camera 152 (imaging device 15).

The image conversion process for obtaining the left side corrected surrounding image C12 from the left side surrounding image C2 can be executed by basically the same processing procedure as that of the above-described image conversion process for obtaining the front corrected surrounding image C11 from the front surrounding image C1.

As described above, since the vanishing point 20 does not exist in the left side surrounding image C2 of the present example, the vanishing point 20 does not exist in the substantial captured image of the left side corrected surrounding image C12, and the vanishing point 20 is located outside the substantial captured image in the left side corrected surrounding image C12.

Note that in a case where the vanishing point 20 exists in the left side surrounding image C2, the vanishing point 20 exists in the substantial captured image of the left side corrected surrounding image C12.

Figure 8:
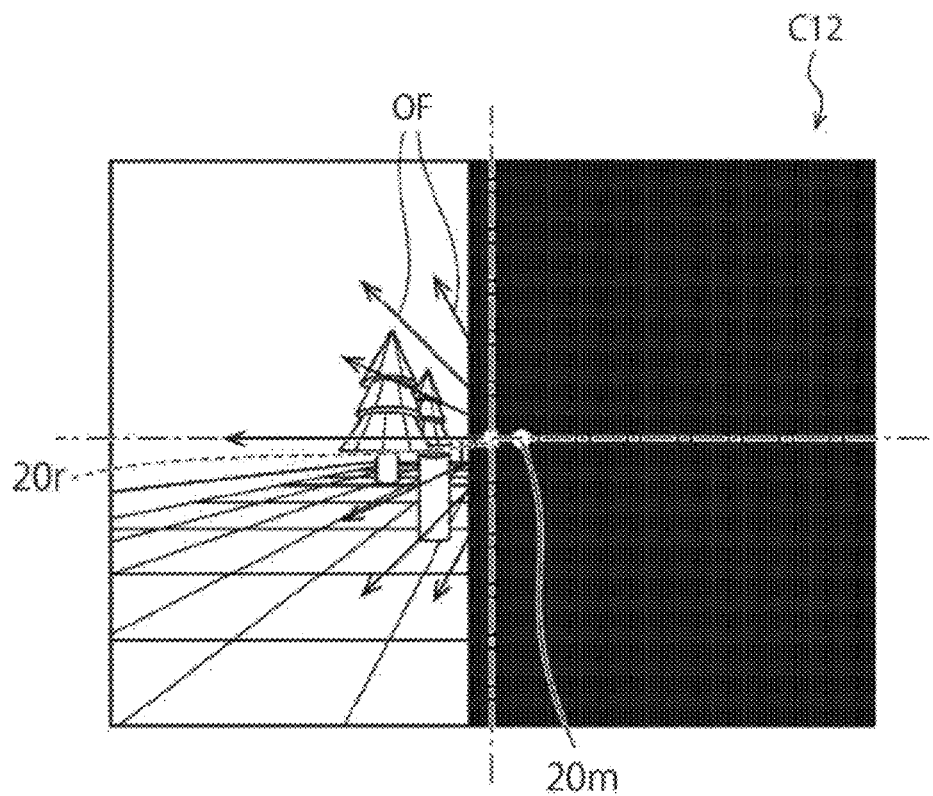
FIG. 8 is a view illustrating an example of optical flows in the left side corrected surrounding image illustrated in FIG. 7.

FIG. 8 is a view illustrating an example of an optical flow OF in the left side corrected surrounding image C12 illustrated in FIG. 7.

The optical flow OF in the left side corrected surrounding image C12 generated from the left side surrounding image C2 captured and acquired while the vehicle 11 is traveling is located on a straight line passing through the vanishing point 20 as described above and extends in a direction away from the vanishing point 20. In particular, in the left side corrected surrounding image C12 from which image distortion caused by the optical system has been removed, the optical flow OF of a subject (particularly, a stationary body) becomes a straight line.

The actual vanishing point (estimated vanishing point 20m) in the left side corrected surrounding image C12 illustrated in FIG. 8 is usually located outside the substantial captured image and located on the extended line of the optical flow OF. That is, an intersection of extended lines of the plurality of optical flows OF in the left side corrected surrounding image C12 corresponds to the estimated vanishing point 20m.

Therefore, the estimated vanishing point 20m can be acquired by obtaining the intersection of the extended lines of the plurality of optical flows OF in the left side corrected surrounding image C12.

Then, the degree of the installation error (for example, the deviation of the pitch angle and the deviation of the yaw angle) of the left side camera 152 in the vehicle 11 can be estimated on the basis of the positional deviation (for example, the number of deviated pixels and the deviation direction) of the estimated vanishing point 20m from the reference vanishing point 20r.

Note that the front surrounding image C1 and the left side surrounding image C2 are images different from each other, but are obtained by imaging the same surrounding environment.

Furthermore, the front corrected surrounding image C11 and the left side corrected surrounding image C12 of the present example are obtained by image conversion in which the vanishing point 20 (reference vanishing point 20r) is arranged at a common position (center of the image).

Therefore, the relative deviation between the estimated vanishing point 20m in the front corrected surrounding image C11 and the estimated vanishing point 20m in the left side corrected surrounding image C12 is correlated with the relative deviation between the installation error of the front camera 151 and the installation error of the left side camera 152.

Therefore, the relative installation error between the front camera 151 and the left side camera 152 can be obtained on the basis of the estimated vanishing point 20m of the front corrected surrounding image C11 and the estimated vanishing point 20m of the left side corrected surrounding image C12.

The installation errors of the right side camera 153 and the back camera 154 can also be acquired similarly to the installation errors of the front camera 151 and the left side camera 152 described above.

By performing various corrections based on the installation error of each imaging device 15 acquired as described above, it is possible to realize the signal processing system 10 capable of executing processing with higher accuracy.

For example, in a case where an image conversion map (image conversion information) is used when an image to be displayed on an image display unit is created, the accuracy of the display image can be expected to be improved by correcting the image conversion map on the basis of the installation error of each imaging device 15.

Furthermore, in the calculation of the distance to a target around the vehicle 11 (distance measurement calculation), the measured distance is corrected on the basis of the installation error of each imaging device 15, whereby improvement in the distance measurement accuracy can be expected.

Next, a specific configuration example of the signal processing system 10 that detects an installation error of each imaging device 15 will be described.

Figure 9:
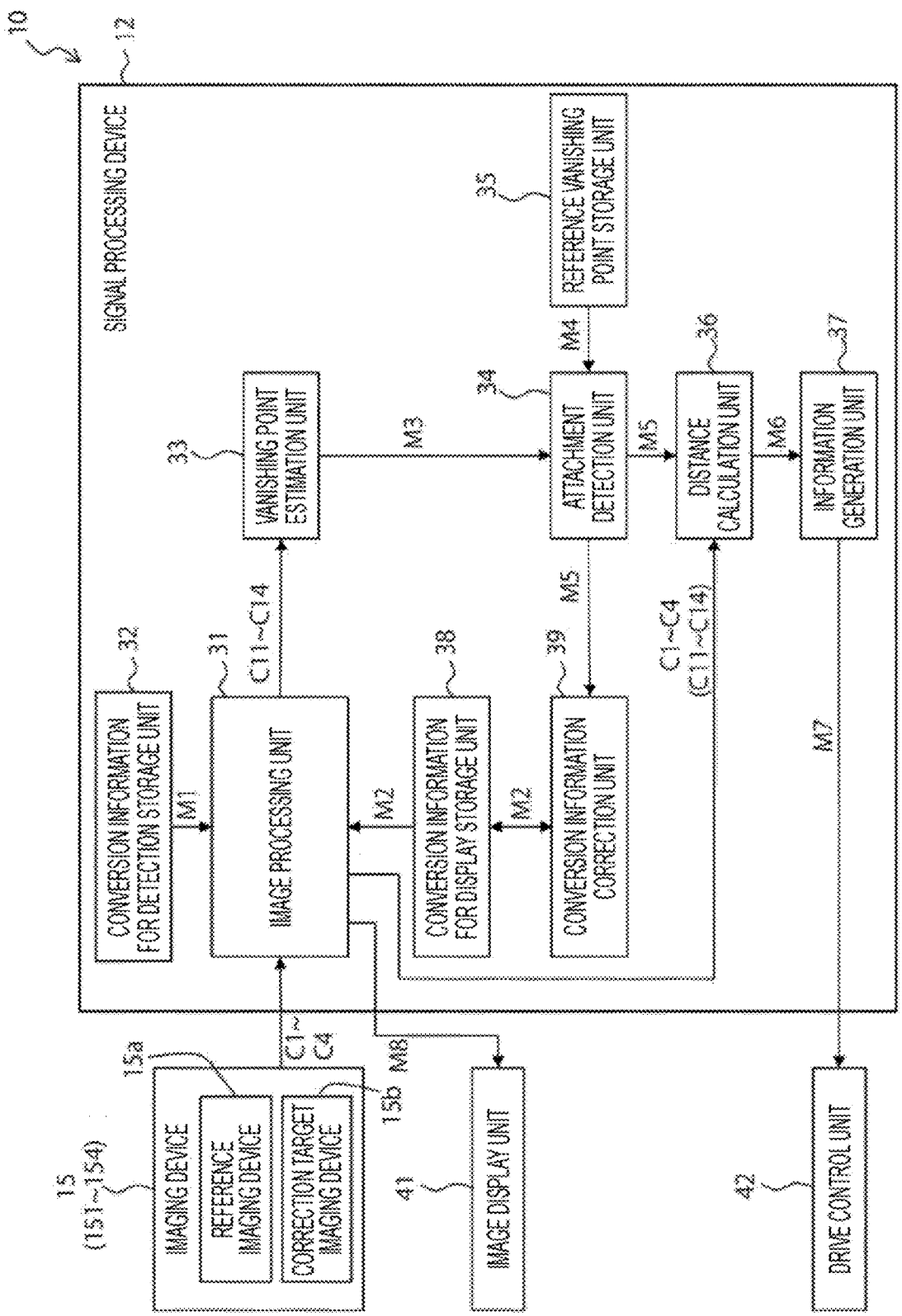
FIG. 9 is a block diagram illustrating an example of a functional configuration of the signal processing system.

FIG. 9 is a block diagram illustrating an example of a functional configuration of the signal processing system 10.

Each functional block illustrated in FIG. 9 can be realized by one or more arbitrary devices. Furthermore, two or more functional blocks illustrated in FIG. 9 may be realized by a common device.

The signal processing device 12 illustrated in FIG. 9 includes an image processing unit 31, a conversion information for detection storage unit 32, a vanishing point estimation unit 33, an attachment detection unit 34, a reference vanishing point storage unit 35, a distance calculation unit 36, an information generation unit 37, a conversion information for display storage unit 38, and a conversion information correction unit 39.

The surrounding images C1 to C4 (see FIGS. 3 and 4) captured and acquired by the respective imaging devices 15 are transmitted from the respective imaging devices 15 to the image processing unit 31.

In the present example, the front surrounding image C1, the left side surrounding image C2, the right side surrounding image C3, and the back surrounding image C4 are sent to the image processing unit 31 from the front camera 151, the left side camera 152, the right side camera 153, and the back camera 154, respectively.

Each of the surrounding images C1 to C4 sent from the respective imaging devices 15 to the image processing unit 31 is an image continuously captured and acquired while the vehicle 11 is traveling in the moving direction Df, and may be a set of a plurality of still images or a video.

Note that, as described later (see FIGS. 11 and 12), in order to acquire imaging attachment information M5 indicating the attachment posture of the imaging device 15, the plurality of imaging devices 15 mounted on the vehicle 11 may be classified into a reference imaging device 15a and a correction target imaging device 15b.

The image processing unit 31 receives the surrounding images C1 to C4 sent from the respective imaging devices 15, and performs various corrections on the surrounding images C1 to C4.

That is, the image processing unit 31 serves as an imaging correction unit that performs distortion correction for reducing image distortion caused by the optical system of the imaging device 15 on the surrounding images C1 to C4.

Furthermore, the image processing unit 31 performs other arbitrary processes (for example, the correction process of adjusting the virtual optical axis, the correction process of adjusting the angle of view, and the correction process of adjusting the position of the vanishing point described above) on the surrounding images C1 to C4.

The image processing unit 31 of the present example reads conversion information (for example, map information) M1 for detection from the conversion information for detection storage unit 32 and applies the conversion information M1 for detection to the surrounding images C1 to C4, thereby performing a correction process of the surrounding images C1 to C4.

The conversion information M1 for detection is determined in advance according to characteristics and imaging conditions of the imaging device 15, and is stored in advance in the conversion information for detection storage unit 32. The conversion information M1 for detection stored in the conversion information for detection storage unit 32 is appropriately updated as necessary.

As a result of the correction process described above, the image processing unit 31 acquires the front corrected surrounding image C11, the left side corrected surrounding image C12, the right side corrected surrounding image C13, and the back corrected surrounding image C14 from the front surrounding image C1 to the back surrounding image C4.

The corrected surrounding images C11 to C14 acquired in this manner are images indicating the environment around the vehicle 11 similarly to captured images (surrounding images C1 to C4) output from the imaging devices 15, and thus can be said to be surrounding images in a broad sense.

These corrected surrounding images C11 to C14 (see FIGS. 5 to 8) are surrounding images used to detect an installation error of the respective imaging devices 15, and are transmitted from the image processing unit 31 to the vanishing point estimation unit 33.

As will be described later, the image processing unit 31 of the present example also functions as a first correction unit that corrects the display image on the basis of the imaging attachment information M5 indicating the attachment posture of each imaging device 15 in cooperation with the conversion information for display storage unit 38 and the conversion information correction unit 39. Note that the image processing unit 31 may correct an image other than the display image on the basis of the imaging attachment information M5.

The vanishing point estimation unit 33 estimates estimated vanishing point position information M3 indicating the position of the vanishing point (that is, the estimated vanishing point 20m) in a surrounding image (corrected surrounding images C11 to C14 in the present example) sent from the image processing unit 31 by analyzing the surrounding image.

As described above, the vanishing point estimation unit 33 of the present example obtains the optical flows of the surrounding image by analyzing the surrounding image corrected by the image processing unit 31 (imaging correction unit), and estimates the estimated vanishing point position information M3 on the basis of the optical flows.

Furthermore, the surrounding images (corrected surrounding images C11 to C14) to be analyzed by the vanishing point estimation unit 33 are images captured and acquired by the imaging devices 15 moving in the moving direction Df, and include an image captured and acquired via the optical system having an optical axis non-parallel to the moving direction Df.

The estimated vanishing point position information M3 acquired in this manner is transmitted from the vanishing point estimation unit 33 to the attachment detection unit 34.

On the basis of the estimated vanishing point position information M3 sent from the vanishing point estimation unit 33 and reference vanishing point position information M4 indicating the position of the reference vanishing point 20r, the attachment detection unit 34 acquires the imaging attachment information M5 indicating the attachment posture of each imaging device 15.

A specific method of calculating the imaging attachment information M5 in the attachment detection unit 34 is not limited. For example, in a case where the reference vanishing point position information M4 set in advance is used, the attachment detection unit 34 may read the reference vanishing point position information M4 from the reference vanishing point storage unit 35 and use the reference vanishing point position information M4.

A specific calculation example of the imaging attachment information M5 will be described later (see FIGS. 10 to 12).

The imaging attachment information M5 acquired in this manner is transmitted from the attachment detection unit 34 to the conversion information correction unit 39 and the distance calculation unit 36.

The conversion information correction unit 39 reads the conversion information M2 for display from the conversion information for display storage unit 38, and corrects the conversion information M2 for display by using the imaging attachment information M5 sent from the attachment detection unit 34.

The conversion information M2 for display is conversion information (for example, map information) applied to the surrounding images (surrounding images C1 to C4 and/or the corrected surrounding images C11 to C14) in order to generate a display image M8 in the image processing unit 31.

The conversion information M2 for display serving as a reference is stored in advance in the conversion information for display storage unit 38.

The conversion information correction unit 39 corrects the conversion information M2 for display on the basis of the imaging attachment information M5, thereby obtaining the conversion information M2 for display capable of generating the display image M8 in which a defect caused by the actual attachment posture of the imaging device 15 is reduced.

The conversion information M2 for display thus corrected is transmitted from the conversion information correction unit 39 to the conversion information for display storage unit 38 and stored in the conversion information for display storage unit 38. Then, the image processing unit 31 reads the conversion information M2 for display (particularly, the corrected conversion information M2 for display) from the conversion information for display storage unit 38.

Note that the conversion information for display storage unit 38 stores both conversion information M2 for display before being corrected by the conversion information correction unit 39 (that is, conversion information M2 for display serving as a reference) and corrected conversion information M2 for display.

The conversion information correction unit 39 may directly transmit the corrected conversion information M2 for display to the image processing unit 31 without storing the conversion information M2 for display in the conversion information for display storage unit 38.

The image processing unit 31 generates the display image M8 on the basis of the surrounding images (the surrounding images C to C4 and/or the corrected surrounding images C11 to C14). In particular, in order to generate the display image M8 by applying the conversion information M2 for display corrected on the basis of the imaging attachment information M5 to the surrounding images, the image processing unit 31 of the present example simultaneously generates the display image M8 and corrects the display image M8.

Therefore, it is possible to obtain the display image M8 in which the defect caused by the actual attachment posture of the imaging device 15 is eliminated or reduced.

Then, the display image M8 is transmitted from the image processing unit 31 to the image display unit 41 mounted on the vehicle 11, and is displayed on the image display unit 41.

The driver or the like of the vehicle 11 can check and monitor the situation around the vehicle 11 by visually recognizing the display image M8 displayed on the image display unit 41.

The distance calculation unit 36 acquires target distance measurement information M6 indicating the distance from the vehicle 11 to a surrounding target on the basis of the surrounding images (the surrounding images C1 to C4 and/or the corrected surrounding images C11 to C14) sent from the image processing unit 31.

The distance calculation unit 36 may acquire the target distance measurement information M6 on the basis of a detection result of an active sensor (for example, a millimeter wave radar, a laser radar, and/or a sonar or the like) not illustrated, instead of the surrounding image. Furthermore, the distance calculation unit 36 may acquire the target distance measurement information M6 on the basis of the detection result of the active sensor in addition to the surrounding images (the surrounding images C1 to C4 and/or the corrected surrounding images C11 to C14).

Moreover, the distance calculation unit 36 of the present example functions as a second correction unit that corrects the target distance measurement information M6 on the basis of the imaging attachment information M5 from the attachment detection unit 34.

Therefore, it is possible to obtain the target distance measurement information M6 in which the defect caused by the actual attachment posture of the imaging device 15 is eliminated or reduced.

The target distance measurement information M6 acquired in this manner is transmitted from the distance calculation unit 36 to the information generation unit 37.

The information generation unit 37 generates drive control information M7 from the target distance measurement information M6. The drive control information M7 is a drive control signal for driving a drive control unit 42. The drive control information M7 may be, for example, information obtained by data conversion of the target distance measurement information M6 into a format suitable for drive of the drive control unit 42.

The drive control information M7 is transmitted from the information generation unit 37 to the drive control unit 42.

The drive control unit 42 operates on the basis of the drive control information M7 transmitted from the information generation unit 37. The drive control unit 42 is not particularly limited, and may include one or a plurality of arbitrary devices.

As an example, the drive control unit 42 may include a braking drive control mechanism of the vehicle 11, and can perform braking according to the distance to the surrounding target indicated by the drive control information M7. Furthermore, the drive control unit 42 may include an alarm mechanism, and may issue an alarm according to the distance to the surrounding target indicated by the drive control information M7.

According to the signal processing system 10 illustrated in FIG. 9 described above, the conversion information M2 for display and the target distance measurement information M6 are corrected according to the installation error of the imaging device 15 with respect to the vehicle 11, and the display image M8 and the drive control information M7 in which the influence of the installation error is reduced can be provided.

Next, a specific calculation example of the imaging attachment information M5 in the attachment detection unit 34 will be described.

[First Signal Processing Method]

Figure 10:
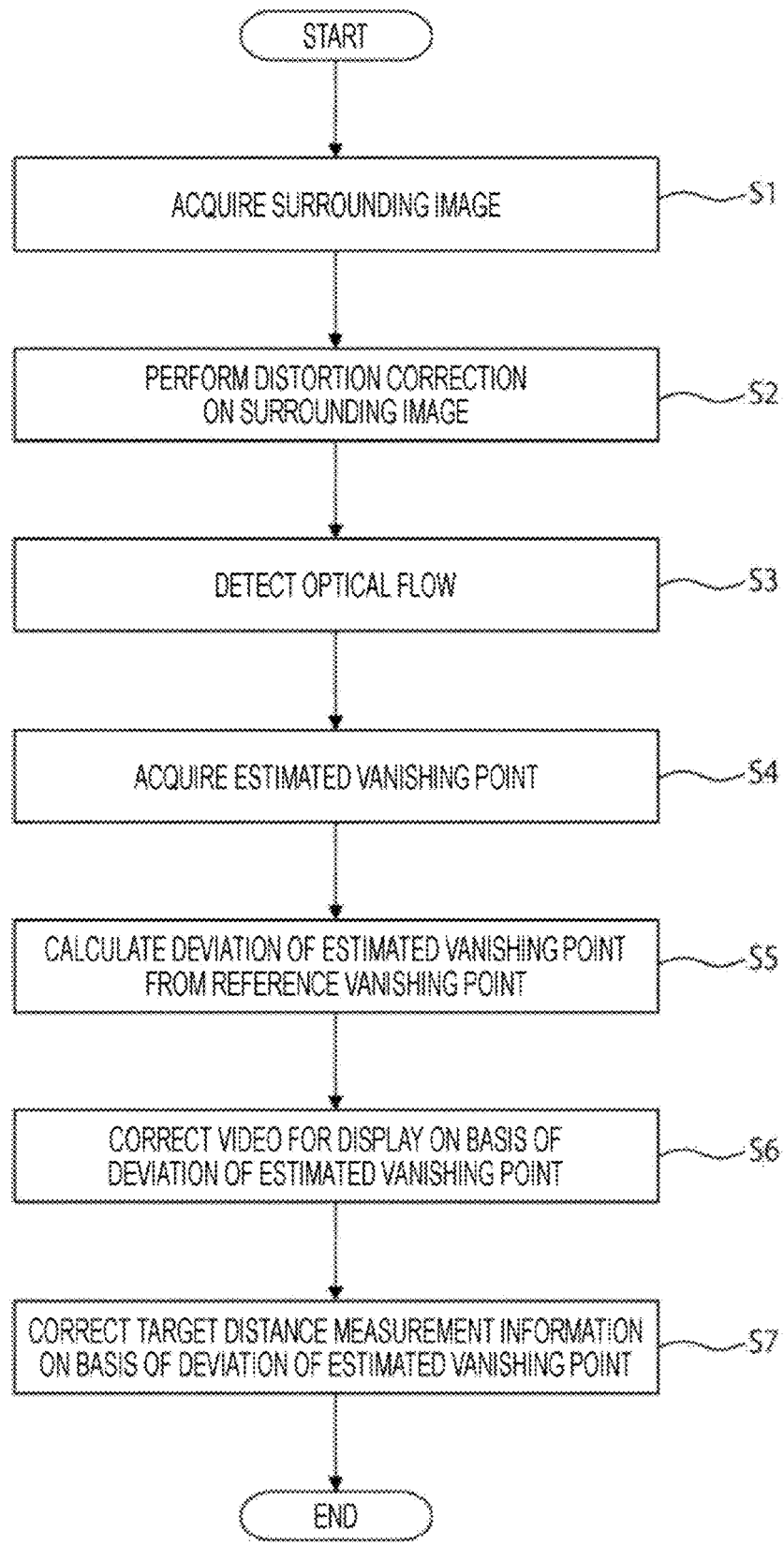
FIG. 10 is a flowchart illustrating a first signal processing method.

FIG. 10 is a flowchart illustrating a first signal processing method.

In the present example, the estimated vanishing point 20m is obtained for each imaging device 15, and an installation error is obtained by comparing the estimated vanishing point 20m with the predetermined reference vanishing point 20r.

First, the image processing unit 31 causes the respective imaging devices 15 moving in the moving direction Df to perform imaging, and acquires the surrounding images C1 to C4 (S1 in FIG. 10). The surrounding images C1 to C4 acquired in this manner include the surrounding images C2 and C3 captured by the imaging devices 15 (the left side camera 152 and the right side camera 153) each including the optical system having the optical axis non-parallel to the moving direction Df.

Then, the image processing unit 31 applies the conversion information M1 for detection to the surrounding images C1 to C4, and performs various correction processes (including distortion correction) on the surrounding images C1 to C4 (S2).

The corrected surrounding images C11 to C14 obtained as a result of the correction process are analyzed by the vanishing point estimation unit 33, and the optical flows OF in each of the corrected surrounding images C11 to C14 are detected (S3).

Then, the vanishing point estimation unit 33 acquires the estimated vanishing point 20m in each of the corrected surrounding images C11 to C14 on the basis of the optical flows OF (S4).

As described above, the vanishing point estimation unit 33 estimates the first estimated vanishing point position information indicating the position of the vanishing point 20 in the first imaging direction image regarding the first imaging direction acquired by the first imaging device (for example, the front camera 151) by analyzing the first imaging direction image.

Similarly, the vanishing point estimation unit 33 estimates the second estimated vanishing point position information indicating the position of the vanishing point 20 in the second imaging direction image regarding the second imaging direction acquired by the second imaging device (for example, the left side camera 152) by analyzing the second imaging direction image. In this manner, the estimated vanishing point position information M3 indicating the position of the vanishing point 20 is estimated by analyzing the surrounding image acquired via the optical system having the optical axis non-parallel to the moving direction Df among the surrounding images acquired by the imaging devices 15 moving in the moving direction Df.

Then, the attachment detection unit 34 acquires the reference vanishing point position information M4 from the reference vanishing point storage unit 35. Then, the attachment detection unit 34 calculates the deviation of the estimated vanishing point 20$m$ of each of the corrected surrounding images C11 to C14 from the reference vanishing point position information M4, and acquires the imaging attachment information M5 (S5).

In this manner, the imaging attachment information M5 indicating the attachment posture of the imaging device 15 is acquired on the basis of the estimated vanishing point position information M3 and the reference vanishing point position information M4 set in advance. That is, the attachment detection unit 34 acquires the imaging attachment information M5 of the first imaging device and the imaging attachment information M5 of the second imaging device on the basis of the first estimated vanishing point position information, the second estimated vanishing point position information, and the reference vanishing point position information M4. More specifically, the attachment detection unit 34 acquires the first imaging attachment information of the first imaging device on the basis of the first estimated vanishing point position information and the reference vanishing point position information M4, and acquires the second imaging attachment information on the basis of the second estimated vanishing point position information and the reference vanishing point position information M4.

Then, the conversion information correction unit 39 corrects the conversion information M2 for display by using the imaging attachment information M5 based on the deviation of the estimated vanishing point 20$m$.

Then, the image processing unit 31 applies the corrected conversion information M2 for display to the surrounding images (the surrounding images C1 to C4 and/or the corrected surrounding images C11 to C14), and generates the display image M8 corrected on the basis of the imaging attachment information M5 (S6).

The display image M8 corrected in this manner is displayed on the image display unit 41.

In contrast, the distance calculation unit 36 calculates the distance from the vehicle 11 to a surrounding target to acquire the target distance measurement information M6, and corrects the target distance measurement information M6 by using the imaging attachment information M5 from the attachment detection unit 34 (S7).

Then, the information generation unit 37 acquires the drive control information M7 from the corrected target distance measurement information M6. The drive control information M7 is used for driving the drive control unit 42.

[Second Signal Processing Method]

Figure 11:
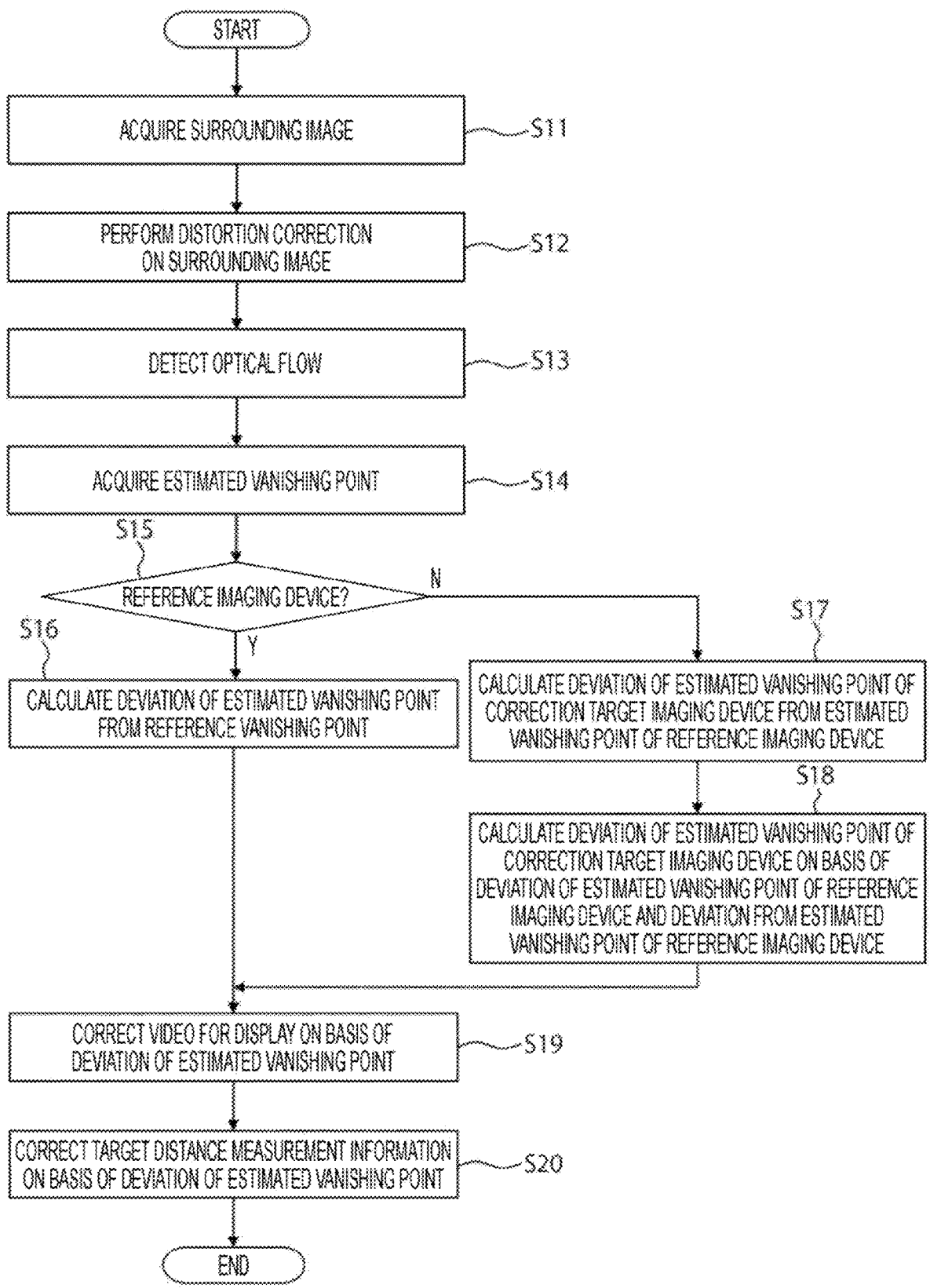
FIG. 11 is a flowchart illustrating a second signal processing method.

FIG. 11 is a flowchart illustrating a second signal processing method.

In the present example, detailed description of processing similar to that of the above-described first signal processing method (see FIG. 10) is omitted.

The attachment detection unit 34 of the present example acquires the first imaging attachment information indicating the attachment posture of the first imaging device and the second imaging attachment information indicating the attachment posture of the second imaging device on the basis of the first estimated vanishing point position information, the second estimated vanishing point position information, and the reference vanishing point position information. Here, the first imaging direction image and the second imaging direction image (surrounding images C1 to C4) may or may not include the vanishing point 20.

Also in the present example, similarly to the first signal processing method described above, the surrounding images C1 to C4 are acquired (S11 in FIG. 11), and various correction processes including the distortion correction process are performed on the surrounding images C1 to C4 to acquire the corrected surrounding images C11 to C14 (S12). Then, the optical flows of the corrected surrounding images C11 to C14 are detected (S13), and the estimated vanishing points 20$m$ in the corrected surrounding images C11 to C14 are acquired from the optical flows (S14).

Then, the estimated vanishing point 20$m$ of the reference imaging device 15$a$ (Y in S15) is compared with the reference vanishing point 20$r$ indicated by the reference vanishing point position information M4 by the attachment detection unit 34. The reference vanishing point position information M4 used herein is read from the reference vanishing point storage unit 35.

As a result, the deviation of the estimated vanishing point 20$m$ of the reference imaging device 15$a$ from the reference vanishing point 20$r$ is calculated, and the imaging attachment information M5 based on the deviation is acquired (S16).

The reference imaging device 15$a$ described herein may be any of the plurality of imaging devices 15 mounted on the vehicle 11.

For example, the imaging device 15 (for example, the front camera 151 and/or the back camera 154) that captures and acquires a surrounding image including a vanishing point may be the reference imaging device 15$a$.

Alternatively, the imaging device 15 (for example, the left side camera 152 and/or the right side camera 153) that captures and acquires a surrounding image that does not include a vanishing point may be the reference imaging device 15$a$.

As described above, the attachment detection unit 34 of the present example acquires the first imaging attachment information indicating the attachment posture of the first imaging device (reference imaging device 15$a$) on the basis of the first estimated vanishing point position information and the reference vanishing point position information M4.

In contrast, the estimated vanishing point 20$m$ of the correction target imaging device 15$b$ (N in S15) is compared with the estimated vanishing point 20$m$ of the reference imaging device 15$a$ by the attachment detection unit 34 (S17).

As a result, the deviation of the estimated vanishing point 20$m$ of the correction target imaging device 15$b$ from the estimated vanishing point 20$m$ of the reference imaging device 15$a$ is calculated.

Then, the attachment detection unit 34 calculates the deviation of the estimated vanishing point 20$m$ of the correction target imaging device 15$b$ on the basis of the "deviation (S16) of the estimated vanishing point 20$m$ of the reference imaging device 15$a$" and the "deviation (S17) from the estimated vanishing point 20$m$ of the reference imaging device 15$a$" (S18).

Then, the attachment detection unit 34 acquires the imaging attachment information M5 of the correction target imaging device 15$b$ on the basis of the deviation of the estimated vanishing point 20$m$ of the correction target imaging device 15$b$.

As described above, regarding the imaging device (correction target imaging device 15$b$) other than the reference imaging device 15$a$, the difference between the estimated vanishing point 20$m$ of the correction target imaging device 15$b$ and the estimated vanishing point 20$m$ of the reference imaging device 15$a$ is obtained. Then, the deviation amount of the estimated vanishing point 20$m$ of the correction target imaging device 15$b$ is obtained by adding the deviation amount from the design value (reference vanishing point 20r) of the estimated vanishing point 20m of the reference imaging device 15a to the difference value.

Therefore, the attachment detection unit 34 of the present example acquires the second imaging attachment information indicating the attachment posture of the correction target imaging device 15b (second imaging device) on the basis of the first estimated vanishing point position information, the second estimated vanishing point position information, and the first imaging attachment information.

Then, similarly to the first signal processing method described above, the display image M8 corrected on the basis of the imaging attachment information M5 is generated (S19). Furthermore, the target distance measurement information M6 is corrected on the basis of the imaging attachment information M5 (S20).

[Third Signal Processing Method]

Figure 12:
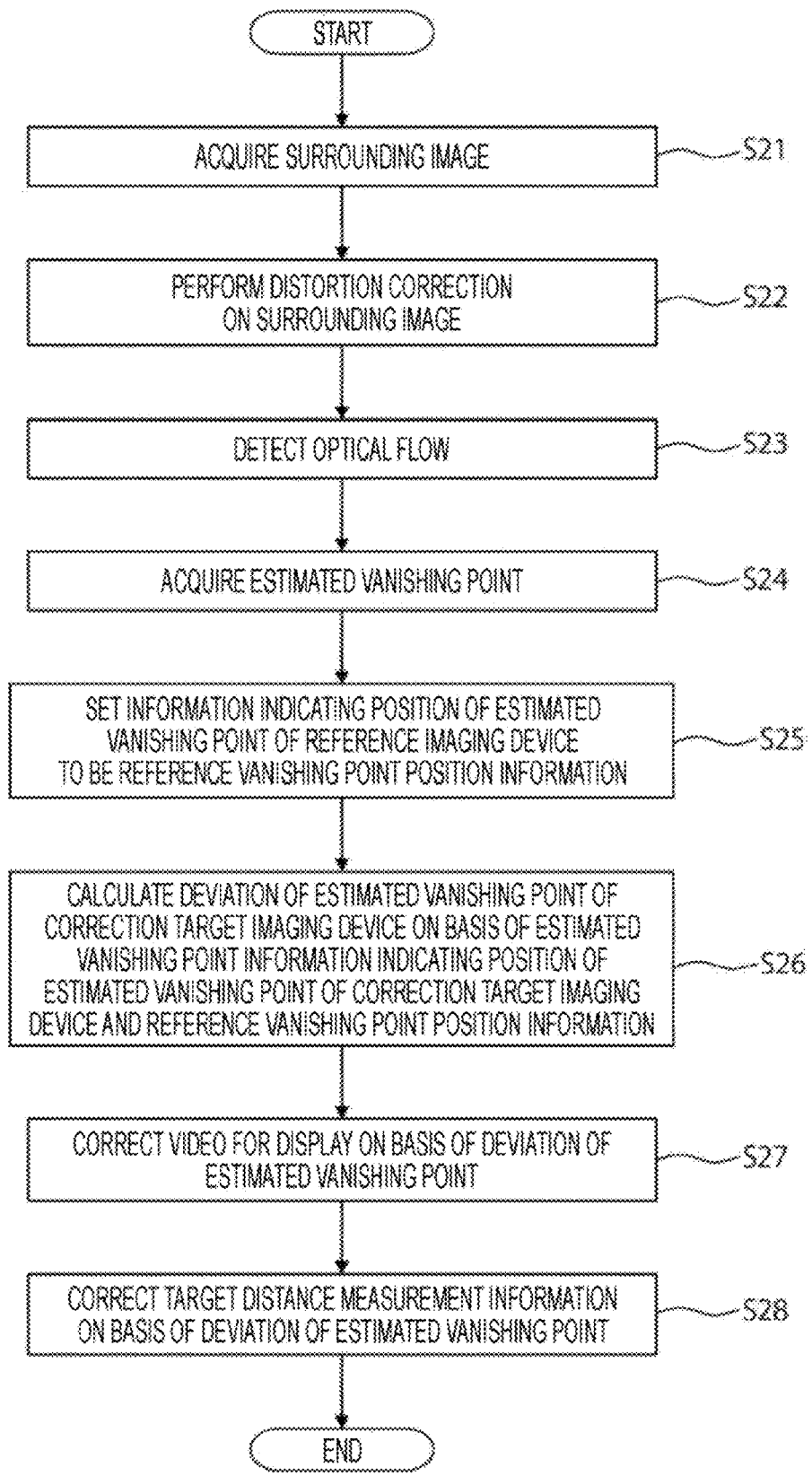
FIG. 12 is a flowchart illustrating a third signal processing method.

FIG. 12 is a flowchart illustrating a third signal processing method.

In the present example, detailed description of processing similar to those of the above-described first signal processing method and second signal processing method (see FIGS. 10 and 11) is omitted.

In the present example, by using the estimated vanishing point 20m of the reference imaging device 15a as the reference vanishing point 20r, the deviation of the estimated vanishing point 20m of another imaging device (correction target imaging device 15b) is calculated.

Also in the present example, similarly to the first signal processing method and the second signal processing method described above, the surrounding images C1 to C4 are acquired (S21 in FIG. 12), and various correction processes including the distortion correction process are performed on the surrounding images C1 to C4 to acquire the corrected surrounding images C11 to C14 (S22). Then, the optical flows of the corrected surrounding images C11 to C14 are detected (S23), and the estimated vanishing points 20m in the corrected surrounding images C11 to C14 are acquired from the optical flows (S24).

Then, the attachment detection unit 34 sets information indicating the position of the estimated vanishing point 20m of the reference imaging device 15a to be the reference vanishing point position information M4 (S25). The reference imaging device 15a described herein may be any of the plurality of imaging devices 15 mounted on the vehicle 11.

In contrast, the attachment detection unit 34 calculates the deviation of the estimated vanishing point 20m of the correction target imaging device 15b on the basis of the estimated vanishing point position information M3 indicating the position of the estimated vanishing point 20m of the correction target imaging device 15b other than the reference imaging device 15a and the reference vanishing point position information M4 (S26).

As described above, the attachment detection unit 34 of the present example sets the estimated vanishing point 20m of the first imaging device (reference imaging device 15a) as the reference vanishing point 20r, and uses the first estimated vanishing point position information indicating the position of the reference vanishing point 20r as the reference vanishing point position information M4. Then, the attachment detection unit 34 acquires imaging attachment information indicating the attachment posture of the second imaging device on the basis of the second estimated vanishing point position information indicating the position of the estimated vanishing point 20m of the second imaging device (correction target imaging device 15b) and the first estimated vanishing point position information (reference vanishing point position information M4).

The attachment detection unit 34 acquires the imaging attachment information M5 of the reference imaging device 15a and the correction target imaging device 15b on the basis of the deviation between the estimated vanishing points 20m of the reference imaging device 15a and the correction target imaging device 15b obtained in this manner.

Then, similarly to the first signal processing method and the second signal processing method described above, the display image M8 corrected on the basis of the imaging attachment information M5 is generated (S27). Furthermore, the target distance measurement information M6 is corrected on the basis of the imaging attachment information M5 (S28).

As described above, according to the above-described embodiment, it is possible to detect an installation error of the plurality of imaging devices 15 mounted on the vehicle 11 at the time of traveling of the vehicle 11 without using a detection chart. In particular, it is possible to appropriately detect an installation error of the imaging device 15 (for example, the left side camera 152 and the right side camera 153) that acquire captured images (surrounding images) essentially not including the vanishing point 20.

Then, accuracy of data can be improved by correcting the display image, distance measurement data, and other data using the captured image of the imaging device 15 on the basis of the installation error of the imaging device 15. Therefore, a highly accurate system (for example, a peripheral monitoring system and a parking assistance system) can be realized.

Note that, as a method of detecting an installation error of the camera, a method of using an image obtained by capturing a calibration chart (for example, a checkered chart) as a reference image is known. In this method, the camera installed in the vehicle captures the calibration chart in a state where the vehicle and the camera are stationary. By comparing the image of the calibration chart acquired in this manner with an ideal image acquired in advance, it is possible to detect the installation error of the camera. Then, by adjusting the installation angle (installation posture) of the camera on the basis of the installation error of the camera detected in this manner, installation of the camera can be optimized.

As another method, there is also a method of detecting an installation error of the camera without using a calibration chart. For example, there is a method of detecting an installation error of the camera on the basis of the vanishing point 20 derived from a surrounding image acquired during traveling of the vehicle. However, in this method, if the vanishing point 20 does not exist in the captured image, the installation error of the camera cannot be detected. Therefore, for example, regarding cameras whose imaging direction is not oriented in the moving direction (for example, side cameras (the left side camera 152 and the right side camera 153) installed in door mirrors), an installation error cannot be detected by this method.

In contrast, according to the signal processing system 10 and the signal processing method according to the above-described embodiment, it is possible to easily detect the installation errors of the respective imaging devices 15 on the basis of the surrounding images C1 to C4 captured while the vehicle 11 is traveling without using the calibration chart. Furthermore, not only an installation error of the imaging device 15 in which the vanishing point 20 is essentially included in the imaging range but also an installation error of the imaging device 15 in which the vanishing point 20 is essentially not included in the imaging range can be detected.

[Modification]

In the imaging device 15 mounted on the vehicle 11 linearly traveling in the moving direction Df, the vanishing point 20 can exist not only in the front surrounding image C1 acquired by the front camera 151 but also in the back surrounding image C4 acquired by the back camera 154.

Therefore, for example, the back camera 154 can also be classified into the above-described reference imaging device 15*a*.

Furthermore, both the front camera 151 and the back camera 154 may be classified into the reference imaging devices 15*a*.

In this case, the deviation of the estimated vanishing point 20*m* of the correction target imaging device 15*b* (for example, the left side camera 152 and the right side camera 153) may be calculated on the basis of the estimated vanishing point 20*m* of each of the front camera 151 and the back camera 154.

Then, the deviation of the estimated vanishing point 20*m* of the correction target imaging device 15*b* from the estimated vanishing point 20*m* of the front camera 151 and the deviation of the estimated vanishing point 20*m* of the correction target imaging device 15*b* from the estimated vanishing point 20*m* of the back camera 154 may be compared. By calculating the average of the plurality of types (two types) of "deviations of the estimated vanishing point 20*m* of the correction target imaging device 15*b*" obtained in this manner, the calculation accuracy of the "deviation of the estimated vanishing point 20*m* of the correction target imaging device 15*b*" can be improved.

The plurality of imaging devices 15 mounted on the vehicle 11 may have the same performance or different performance from each other.

For example, in recent years, in addition to the imaging device 15 for peripheral monitoring, the imaging device 15 for sensing is mounted on the vehicle 11 in some cases. The imaging device 15 for sensing has a narrower angle of view and higher image (video) resolution as compared with those of the imaging device 15 for peripheral monitoring in some cases. In this case, by using the imaging device 15 for sensing as the above-described reference imaging device 15*a*, the detection accuracy of the installation error of each imaging device 15 is improved.

It should be noted that the embodiments and modifications disclosed in the present description are illustrative only in all respects and are not to be construed as limiting. The above-described embodiments and modifications can be omitted, replaced, and changed in various forms without departing from the scope and spirit of the appended claims. For example, the above-described embodiments and modifications may be combined in whole or in part, and other embodiments may be combined with the above-described embodiments or modifications. Furthermore, the effects of the present disclosure described in the present description are merely exemplification, and other effects may be provided.

A technical category embodying the above technical idea is not limited. For example, the above-described technical idea may be embodied by a computer program for causing a computer to execute one or a plurality of procedures (steps) included in a method of manufacturing or using the above-described device. Furthermore, the above-described technical idea may be embodied by a computer-readable non-transitory recording medium in which such a computer program is recorded.

[Appendix]

The present disclosure can also have the following configurations.

[Item 1]

A signal processing device including:
a vanishing point estimation unit that acquires a surrounding image captured by an imaging device including an optical system which has an optical axis non-parallel to a moving direction of the imaging device and estimates estimated vanishing point position information indicating a position of a vanishing point by analyzing the surrounding image; and
an attachment detection unit that acquires imaging attachment information indicating an attachment posture of the imaging device on the basis of the estimated vanishing point position information and reference vanishing point position information indicating a position of a reference vanishing point.

[Item 2]

The signal processing device according to item 1, in which the surrounding image includes the vanishing point.

[Item 3]

The signal processing device according to item 1, in which the surrounding image does not include the vanishing point.

[Item 4]

The signal processing device according to any one of items 1 to 3,
in which the surrounding image includes a first imaging direction image related to a first imaging direction acquired by a first imaging device and a second imaging direction image related to a second imaging direction acquired by a second imaging device different from the first imaging device,
the vanishing point estimation unit estimates first estimated vanishing point position information indicating a position of the vanishing point by analyzing the first imaging direction image, and estimates second estimated vanishing point position information indicating a position of the vanishing point by analyzing the second imaging direction image, and
the attachment detection unit acquires the imaging attachment information on the basis of the first estimated vanishing point position information, the second estimated vanishing point position information, and the reference vanishing point position information.

[Item 5]

The signal processing device according to item 4,
in which the attachment detection unit
acquires first imaging attachment information indicating an attachment posture of the first imaging device on the basis of the first estimated vanishing point position information and the reference vanishing point position information, and
acquires second imaging attachment information indicating an attachment posture of the second imaging device on the basis of the second estimated vanishing point position information and the reference vanishing point position information.

[Item 6]

The signal processing device according to item 4,
in which the attachment detection unit
acquires first imaging attachment information indicating an attachment posture of the first imaging device on the basis of the first estimated vanishing point position information and the reference vanishing point position information, and acquires second imaging attachment information indicating an attachment posture of the second imaging device on the basis of the first estimated vanishing point position information, the second estimated vanishing point position information, and the first imaging attachment information.

[Item 7]

The signal processing device according to any one of items 1 to 3,
  in which the surrounding image includes a first imaging direction image related to a first imaging direction acquired by a first imaging device and a second imaging direction image related to a second imaging direction acquired by a second imaging device different from the first imaging device,
  the vanishing point estimation unit estimates first estimated vanishing point position information indicating a position of the vanishing point by analyzing the first imaging direction image, and estimates second estimated vanishing point position information indicating a position of the vanishing point by analyzing the second imaging direction image, and
  the attachment detection unit acquires the imaging attachment information indicating an attachment posture of the second imaging device by using the first estimated vanishing point position information as the reference vanishing point position information.

[Item 8]

The signal processing device according to any one of items 1 to 7 further including
  an imaging correction unit that performs correction for reducing image distortion caused by the optical system on the surrounding image,
  in which the vanishing point estimation unit estimates the estimated vanishing point position information by analyzing the surrounding image corrected by the imaging correction unit.

[Item 9]

The signal processing device according to any one of items 1 to 8,
  in which the vanishing point estimation unit estimates the estimated vanishing point position information on the basis of an optical flow of the surrounding image.

[Item 10]

The signal processing device according to any one of items 1 to 9 further including
  a first correction unit that corrects an image on the basis of the imaging attachment information.

[Item 11]

The signal processing device according to any one of items 1 to 10 further including
  a second correction unit that corrects a target distance measurement information indicating a distance to a surrounding target on the basis of the imaging attachment information.

[Item 12]

A signal processing system including:
  an imaging device that is mounted on a mobile object and acquires a surrounding image via an optical system which has an optical axis non-parallel to a moving direction of the mobile object; and
  a signal processing device that detects an attachment posture of the imaging device on the basis of the surrounding image,
  the signal processing device including
    a vanishing point estimation unit that receives the surrounding image captured by the imaging device, and estimates estimated vanishing point position information indicating a position of a vanishing point by analyzing the surrounding image acquired via the optical system which has the optical axis non-parallel to the moving direction, and
    an attachment detection unit that acquires imaging attachment information indicating an attachment posture of the imaging device on the basis of the estimated vanishing point position information and reference vanishing point position information indicating a position of a reference vanishing point.

[Item 13]

The signal processing system according to item 12,
  in which the surrounding image includes an image of at least one of an area in front of the mobile object or an area behind the mobile object.

[Item 14]

The signal processing system according to item 12 or 13,
  in which the surrounding image includes an image of an area on a side of the mobile object.

[Item 15]

A signal processing method including:
  a step of acquiring a surrounding image captured by an imaging device including an optical system which has an optical axis non-parallel to a moving direction of the imaging device;
  a step of estimating estimated vanishing point position information indicating a position of a vanishing point by analyzing the surrounding image; and
  a step of acquiring an attachment posture of the imaging device on the basis of the estimated vanishing point position information and reference vanishing point position information indicating a position of a reference vanishing point set in advance.

[Item 16]

A program for causing a computer to execute:
  a procedure of acquiring a surrounding image captured by an imaging device including an optical system which has an optical axis non-parallel to a moving direction of the imaging device;
  a procedure of estimating estimated vanishing point position information indicating a position of a vanishing point by analyzing the surrounding image; and
  a procedure of acquiring an attachment posture of the imaging device on the basis of the estimated vanishing point position information and reference vanishing point position information indicating a position of a reference vanishing point set in advance.

REFERENCE SIGNS LIST

10 Signal processing system
11 Vehicle
12 Signal processing device
15 Imaging device
15a Reference imaging device
15b Correction target imaging device
20 Vanishing point
20r Reference vanishing point
20m Estimated vanishing point
31 Image processing unit
32 Conversion information for detection storage unit
33 Vanishing point estimation unit
34 Attachment detection unit 35 Reference vanishing point storage unit
36 Distance calculation unit
37 Information generation unit
38 Conversion information for display storage unit
39 Conversion information correction unit
41 Image display unit
42 Drive control unit
151 Front camera
152 Left side camera
153 Right side camera
154 Back camera
AF1 Front imaging angle of view range
AF2 Left side imaging angle of view range
AF3 Right side imaging angle of view range
AF4 Back imaging angle of view range
Ax1 Front imaging optical axis
Ax2 Left side imaging optical axis
Ax3 Right side imaging optical axis
Ax4 Back imaging optical axis
C Surrounding image
C1 Front surrounding image
C2 Left side surrounding image
C3 Right side surrounding image
C4 Back surrounding image
C11 Front corrected surrounding image
C12 Left side corrected surrounding image
C13 Right side corrected surrounding image
C14 Back corrected surrounding image
Df Traveling direction
M1 Conversion information for detection
M2 Conversion information for display
M3 Estimated vanishing point position information
M4 Reference vanishing point position information
M5 Imaging attachment information
M6 Target distance measurement information
M7 Drive control information
M8 Display image
OF Optical flow

The invention claimed is:

1. A signal processing device comprising:
a vanishing point estimation unit that acquires a surrounding image captured by an imaging device including an optical system which has an optical axis non-parallel to a moving direction of the imaging device and estimates estimated vanishing point position information indicating a position of a vanishing point by analyzing the surrounding image; and
an attachment detection unit that acquires imaging attachment information indicating an attachment posture of the imaging device on a basis of the estimated vanishing point position information and reference vanishing point position information indicating a position of a reference vanishing point, further comprising
an imaging correction unit that performs correction for reducing image distortion caused by the optical system on the surrounding image,
wherein the vanishing point estimation unit estimates the estimated vanishing point position information by analyzing the surrounding image corrected by the imaging correction unit.

2. The signal processing device according to claim 1, wherein the surrounding image includes the vanishing point.

3. The signal processing device according to claim 1, wherein the surrounding image does not include the vanishing point.

4. The signal processing device according to claim 1,
wherein the surrounding image includes a first imaging direction image related to a first imaging direction acquired by a first imaging device and a second imaging direction image related to a second imaging direction acquired by a second imaging device different from the first imaging device,
the vanishing point estimation unit estimates first estimated vanishing point position information indicating a position of the vanishing point by analyzing the first imaging direction image, and estimates second estimated vanishing point position information indicating a position of the vanishing point by analyzing the second imaging direction image, and
the attachment detection unit acquires the imaging attachment information on a basis of the first estimated vanishing point position information, the second estimated vanishing point position information, and the reference vanishing point position information.

5. The signal processing device according to claim 4,
wherein the attachment detection unit
acquires first imaging attachment information indicating an attachment posture of the first imaging device on a basis of the first estimated vanishing point position information and the reference vanishing point position information, and
acquires second imaging attachment information indicating an attachment posture of the second imaging device on a basis of the second estimated vanishing point position information and the reference vanishing point position information.

6. The signal processing device according to claim 4,
wherein the attachment detection unit
acquires first imaging attachment information indicating an attachment posture of the first imaging device on a basis of the first estimated vanishing point position information and the reference vanishing point position information, and
acquires second imaging attachment information indicating an attachment posture of the second imaging device on a basis of the first estimated vanishing point position information, the second estimated vanishing point position information, and the first imaging attachment information.

7. The signal processing device according to claim 1,
wherein the surrounding image includes a first imaging direction image related to a first imaging direction acquired by a first imaging device and a second imaging direction image related to a second imaging direction acquired by a second imaging device different from the first imaging device,
the vanishing point estimation unit estimates first estimated vanishing point position information indicating a position of the vanishing point by analyzing the first imaging direction image, and estimates second estimated vanishing point position information indicating a position of the vanishing point by analyzing the second imaging direction image, and
the attachment detection unit acquires the imaging attachment information indicating an attachment posture of the second imaging device by using the first estimated vanishing point position information as the reference vanishing point position information.

8. The signal processing device according to claim 1,
wherein the vanishing point estimation unit estimates the estimated vanishing point position information on a basis of an optical flow of the surrounding image.

9. The signal processing device according to claim 1 further comprising
a first correction unit that corrects an image on a basis of the imaging attachment information.

10. The signal processing device according to claim 1 further comprising
a second correction unit that corrects a target distance measurement information indicating a distance to a surrounding target on a basis of the imaging attachment information.

11. A signal processing system comprising:
an imaging device that is mounted on a mobile object and acquires a surrounding image via an optical system which has an optical axis non-parallel to a moving direction of the mobile object; and
a signal processing device that detects an attachment posture of the imaging device on a basis of the surrounding image,
the signal processing device including
a vanishing point estimation unit that receives the surrounding image captured by the imaging device, and estimates estimated vanishing point position information indicating a position of a vanishing point by analyzing the surrounding image acquired via the optical system which has the optical axis non-parallel to the moving direction, and
an attachment detection unit that acquires imaging attachment information indicating an attachment posture of the imaging device on a basis of the estimated vanishing point position information and reference vanishing point position information indicating a position of a reference vanishing point, further comprising
an imaging correction unit that performs correction for reducing image distortion caused by the optical system on the surrounding image,
wherein the vanishing point estimation unit estimates the estimated vanishing point position information by analyzing the surrounding image corrected by the imaging correction unit.

12. The signal processing system according to claim 11, wherein the surrounding image includes an image of at least one of an area in front of the mobile object or an area behind the mobile object.

13. The signal processing system according to claim 11, wherein the surrounding image includes an image of an area on a side of the mobile object.

14. A signal processing method comprising:
a step of acquiring a surrounding image captured by an imaging device including an optical system which has an optical axis non-parallel to a moving direction of the imaging device;
a step of estimating estimated vanishing point position information indicating a position of a vanishing point by analyzing the surrounding image;
a step of acquiring an attachment posture of the imaging device on a basis of the estimated vanishing point position information and reference vanishing point position information indicating a position of a reference vanishing point set in advance; and
a step of performing correction for reducing image distortion caused by the optical system on the surrounding image,
wherein a vanishing point estimation unit estimates the estimated vanishing point position information by analyzing the surrounding image corrected by an imaging correction unit.

15. A non-transient computer readable medium containing program instructions for causing a computer to execute:
a procedure of acquiring a surrounding image captured by an imaging device including an optical system which has an optical axis non-parallel to a moving direction of the imaging device;
a procedure of estimating estimated vanishing point position information indicating a position of a vanishing point by analyzing the surrounding image;
a procedure of acquiring an attachment posture of the imaging device on a basis of the estimated vanishing point position information and reference vanishing point position information indicating a position of a reference vanishing point set in advance; and
a procedure of performing correction for reducing image distortion caused by the optical system on the surrounding image,
wherein a vanishing point estimation unit estimates the estimated vanishing point position information by analyzing the surrounding image corrected by an imaging correction unit.

* * * * *